United States Patent [19]
Taira et al.

[11] 3,924,580
[45] Dec. 9, 1975

[54] MAIN COMBUSTION CHAMBER OF SWIRL CHAMBER TYPE DIESEL ENGINE

[75] Inventors: Kaoru Taira; Hirotoshi Inoue, both of Toyota, Japan

[73] Assignee: Toyota Jidosha Kogyo Kabushiki Kaisha, Japan

[22] Filed: Nov. 15, 1974

[21] Appl. No.: 524,259

[30] Foreign Application Priority Data
May 2, 1974  Japan............................ 49-49547[U]

[52] U.S. Cl. ......... 123/30 C; 123/191 C; 123/193 P
[51] Int. Cl.² ......................... F02F 3/26; F02B 23/02
[58] Field of Search ........ 123/193 P, 193 CP, 32 R, 123/32 B, 32 C, 32 D, 30 C, 30 D, 191 C

[56] References Cited
UNITED STATES PATENTS

| | | | |
|---|---|---|---|
| 2,379,190 | 6/1945 | Sanders...................... | 123/32 C UX |
| 2,935,054 | 5/1960 | Franke et al..................... | 123/32 B |
| 3,105,470 | 10/1963 | Hockel et al..................... | 123/32 B |

FOREIGN PATENTS OR APPLICATIONS

| | | | |
|---|---|---|---|
| 930,498. | 7/1963 | United Kingdom............... | 123/32 B |

*Primary Examiner*—Charles J. Myhre
*Assistant Examiner*—Tony Argenbright
*Attorney, Agent, or Firm*—Stevens, Davis, Miller & Mosher

[57] ABSTRACT

A main combustion chamber that permits efficient combustion throughout the entire rotational speed range comprising a straight groove extending diametrically from an edge portion of the top surface of a piston and a pair of grooves branching right and left from amidst the straight groove in such a curved manner as to return toward the edge of the surface. The straight and curved grooves are formed in the top surface of a piston of a swirl chamber type diesel engine.

3 Claims, 8 Drawing Figures

MAIN COMBUSTION CHAMBER OF SWIRL CHAMBER TYPE DIESEL ENGINE

BACKGROUND OF THE INVENTION

1. Field of the Invention

This invention relates to the shape of a main combustion chamber formed in the top surface of a piston of a swirl chamber type diesel engine.

2. Description of the Prior Art

The so-called swirl chamber type diesel engines are popularly used, in which a swirl chamber is provided and combustion is transmitted to a main combustion chamber by shooting forth flame from the swirl chamber, with a view to attaining better combustion. In such swirl chamber type diesel engines, their main combustion chambers are designed with special shapes, so that effective use is achieved of air in the main combustion chamber formed in the top surface of a piston.

With respect to their shape, the conventional main combustion chambers can be broadly divided into the twin-leaved type main combustion chambers and the grooved type main combustion chambers. The twin-leave type main combustion chambers are suited for medium to low-speed diesel engines; but not for high-speed ones, with which poor combustion results. In contrast, the grooved type main combustion chambers are suited for high-speed diesel engines, but unsuited for low-speed ones because of worsening combustion condition.

OBJECT OF THE INVENTION

Therefore, an object of this invention is to provide a main combustion chamber that affords good combustion condition at all engine speeds.

SUMMARY OF THE INVENTION

A feature of this invention is to provide a main combustion chamber by providing a straight inclined groove at the center of the top surface of the piston, and a pair of branched curved inclined grooves extending from amidst the straight inclined groove.

This arrangement makes it possible to provide a main combustion chamber for a swirl chamber type diesel engine that accomplishes good combustion both at medium and low speed, which is an advantage of the conventional twin-leave type main combustion chamber, and at high speed, which is an advantage of the grooved type main combustion chamber.

BRIEF DESCRIPTION OF THE DRAWING

Now this invention will be described in detail with reference to the accompanying drawings, in which.

Figure 1:
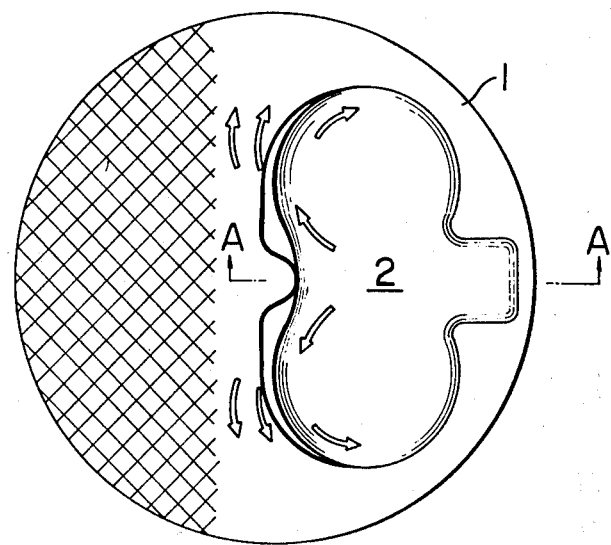
FIG. 1 is a plan view of a known twin-leaved type main combustion chamber.
Figure 2:
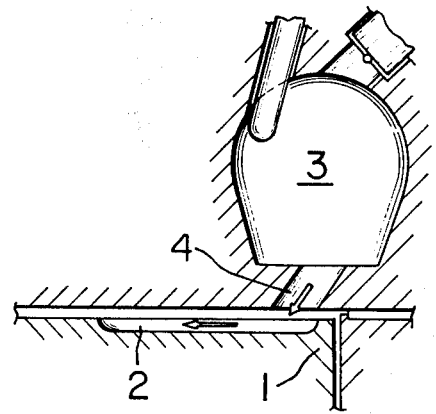
FIG. 2 is a cross section taken along the line A—A of FIG. 1, including a swirl chamber.

A known twin-leave type main combustion chamber will be described first, with reference to FIGS. 1 and 2.

In the top surface of a piston 1 is formed a twin-leaved type main combustion chamber 2, which resembles in shape a pair of swollen leaves parting right and left. Therefore, combustion gas from a swirl chamber 3 flows through a jet 4 as illustrated by the arrows in FIGS. 1 and 2. When combustion gas flows at low speed, it swirls near the jet 4, as illustrated, and burns well. In the high-speed rotation area where air in the obliquely lined portion of FIG. 1 is not fully utilized, the flowing speed of combustion gas increases. Then it does not flow along the main combustion chamber, thereby disturbing said swirl and good combustion.

Figure 3:
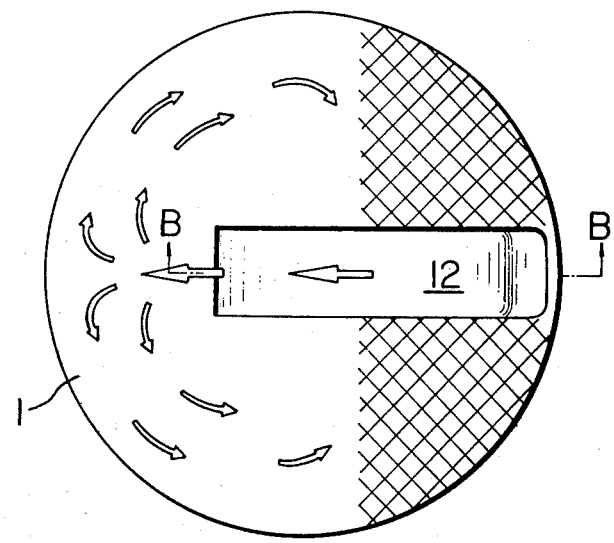
FIG. 3 is a plan view of a known grooved type main combustion chamber.
Figure 4:
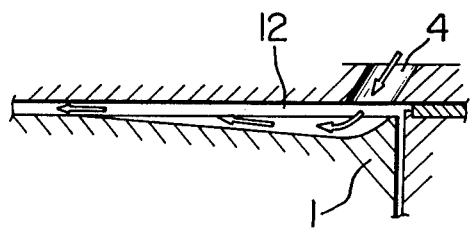
FIG. 4 is a cross section taken along the line B—B of FIG. 3, including a jet of a swirl chamber.

Referring now to FIGS. 3 and 4, a known grooved type main combustion chamber will be described.

A long groove-like main combustion chamber 12 is provided at the center of the top surface of a piston 1. This main combustion chamber 12 is an inclined groove whose depth decreases progressing inward from the edge portion where it faces a jet 4 of the swirl chamber to the center of the piston's top surface (see FIG. 4). Therefore, gas injected through said jet 4 of the swirl chamber flows as illustrated by the arrows in FIGS. 3 and 4.

When combustion gas flows at high speed, good combustion is achieved. But when rotation speed decreases and combustion gas flows at low speed, air in the shaded portion of FIG. 3 is not effectively used.

Figure 5:
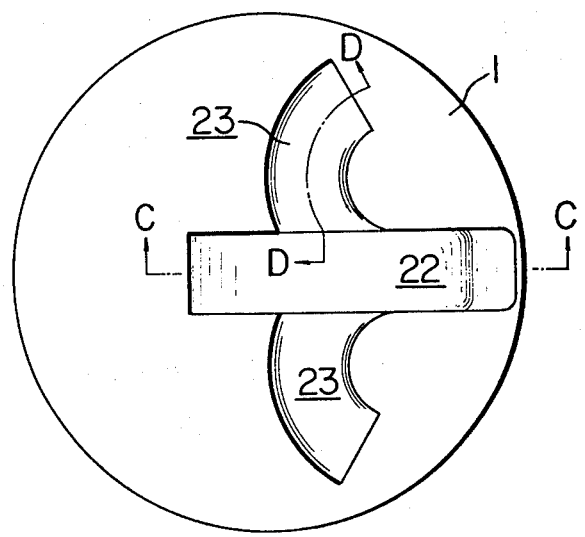
FIG. 5 is a plan view of a main combustion chamber according to this invention.

This invention is designed to obviate such conventional defects as described above. This invention is to be described hereunder with reference to FIGS. 5, 6 and 7.

Figure 6:
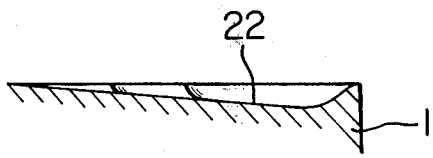
FIG. 6 is a cross section taken along the line C—C of FIG. 5.
Figure 7:
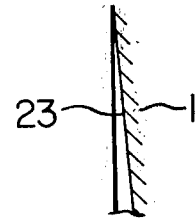
FIG. 7 is a cross section taken along the line D—D of FIG. 5.

In the top surface of a piston 1, there is provided a straight inclined groove 22, which extends diametrically from an edge portion of said surface and becomes shallower as it extends inward (see FIG. 6). There are also provided a pair of branched curved inclined grooves 23, which extend from amidst said straight inclined groove 22 to the edge portion of said top surface and become shallower as they extend (see FIG. 7). The straight inclined groove 22 performs the same function as the conventional grooved main combustion chamber, and its width and length may be designed suitably. On the other hand, the branched curved inclined grooves 23 perform the same function as the conventional twin-leaved type main combustion chamber, extending in such a curved manner as to return toward the edge portion of the piston's top surface. Their width, length and curve, that is, whether circular, elliptic or otherwise, may be suitably designed.

Figure 8:
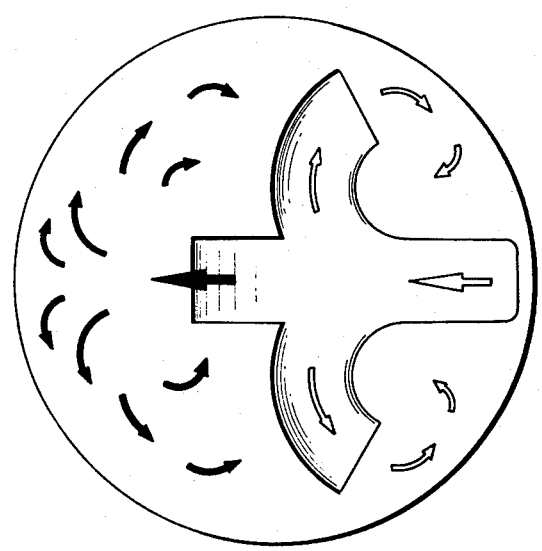
FIG. 8 schematically shows the flow of combustion gas in the main combustion chamber according to this invention.

As described above, the main combustion chamber according to this invention has an approximate shape of the anchor comprising the straight inclined groove 22 and the branched inclined grooves 23. As seen from FIG. 8, therefore, combustion gas from the straight inclined groove 22 almost covers the left half of the piston's top surface, flowing as indicated by the black arrows in the drawing. Combustion gas from the branched inclined grooves 23, on the other hand, almost covers the right half of the surface, flowing as indicated by the white arrows. Consequently, air in the whole area of the piston's top surface is effectively utilized.

Thus, the anchor-shaped main combustion chamber according to this invention makes it possible to obtain good combustion throughout the entire rotation range, from low to high speed. This produces excellent results in improving the engine's efficiency and lowering the concentration of harmful components in the exhaust gas and diesel smoke.

As a result of experiments carried out by applying the main combustion chamber of this invention to the engine of motor vehicles, it has been found that both power output and torque can be increased by 7 to 10 per cent. Also, it has been found that the concentration of diesel smoke or black smoke peculiar to the diesel engine can be lowered.

We claim:

1. In a swirl chamber type diesel engine having a cylinder with a piston slidable therein,
   a main combustion chamber defined in said piston, said main combustion chamber comprising a straight inclined groove formed in the top surface of said piston, said straight groove extending diametrically from an edge portion of said surface and becoming shallower as the groove extends inward from said edge portion, said main combustion chamber further comprising a pair of branched inclined grooves extending from said straight inclined groove, each one of said pair of grooves being curved and having a portion curving back toward said edge portion, and each one of said pair of grooves becoming shallower as it extends from said straight groove.

2. In a diesel engine as claimed in claim 1, wherein:
   each one of said pair of grooves extends away from a respective one of the pair of opposing straight sides of said straight groove.

3. In a diesel engine as claimed in claim 2, wherein:
   each one of said pair of curved grooves extends from said straight groove in a direction away from said edge portion and curves back toward said edge portion.

* * * * *